United States Patent [19]

Lu et al.

[11] Patent Number: 5,451,460

[45] Date of Patent: Sep. 19, 1995

[54] PLASTIC FILMS WITH SURFACE ANTI-FOG PROPERTIES

[75] Inventors: Pang-Chia Lu, Pittsford; Leland W. Reid, Palmyra, both of N.Y.

[73] Assignee: Mobil Oil Corp., Fairfax, Va.

[21] Appl. No.: 80,636

[22] Filed: Jun. 24, 1993

Related U.S. Application Data

[63] Continuation-in-part of Ser. No. 827,312, Jan. 29, 1992, Pat. No. 5,246,756.

[51] Int. Cl.$^6$ ................................................. C09J 7/02
[52] U.S. Cl. ........................................ 428/349; 428/355
[58] Field of Search ................................. 428/349, 355

[56] References Cited

U.S. PATENT DOCUMENTS

| | | | |
|---|---|---|---|
| 3,022,178 | 2/1962 | Park et al. | 106/13 |
| 3,048,263 | 8/1962 | Sacks et al. | 206/45.33 |
| 3,048,265 | 8/1962 | Hackhel et al. | 206/45.34 |
| 3,048,266 | 8/1962 | Hackhel et al. | 206/45.34 |
| 3,205,077 | 9/1965 | Hammond et al. | 99/174 |
| 3,222,191 | 12/1965 | Steiner et al. | 99/174 |
| 3,275,616 | 9/1966 | Hammond et al. | 260/94.9 |
| 3,303,049 | 2/1967 | Hill | 117/138.8 |
| 3,392,133 | 7/1968 | Stickelmeyer | 260/29.6 |
| 3,394,024 | 7/1968 | Owens | 117/76 |
| 3,437,617 | 4/1969 | Bogle | 260/22 |
| 3,479,308 | 11/1969 | Gattenby et al. | 260/23 |
| 3,498,962 | 3/1970 | Bruno | 260/93.7 |
| 3,856,534 | 12/1974 | Fletcher et al. | 106/13 |
| 3,950,289 | 4/1976 | D'Amato et al. | 260/23 XA |
| 4,214,908 | 7/1980 | Deguchi et al. | 106/13 |
| 4,341,825 | 7/1982 | Kemski | 428/349 |
| 4,348,454 | 9/1982 | Eckberg | 428/334 |
| 4,508,635 | 4/1985 | Clarke | 252/174.23 |
| 4,835,194 | 5/1989 | Bright et al. | 523/169 |
| 4,859,511 | 8/1989 | Patterson et al. | 428/40 |
| 4,913,967 | 4/1990 | Bilhorn et al. | 428/411.1 |
| 5,006,398 | 4/1991 | Banerji | 428/220 |
| 5,030,280 | 7/1991 | Hoefer et al. | 106/13 |
| 5,064,717 | 11/1991 | Suzuki et al. | 428/352 |
| 5,084,354 | 1/1992 | Krankkala et al. | 428/414 |

OTHER PUBLICATIONS

Nippon Chemtec Consulting Inc., "Anti-Fog Opp Film For Packaging Of Fresh Vegetables (III)", (V-A-21-2-3), (1989).

Nippon Chemtec Consulting Inc., "Recent Developments of Packaging Materials For Keeping Freshness of Fresh Foods, (III)", (XIII-148-3), (1989).

John Wiley & Sons, "Orientation Processes" *Encyclopedia of Polymer Science & Engineering*, 2nd Edition, vol. 10, pp. 619-628 (1987).

Nippon Chemtec Consutling Inc., "Anti-Fog Sealant Film For Lamination, Aicello Chemical", (V-A-29-4-1), (1987).

Nippon Chemtec Consulting Inc., "Anti-Fog Opp Film For Packaging of Fresh Vegetables", (V-A-212-1), (1985).

Nippon Chemtec Consulting Inc., "Packaging of Fresh Vegetables Using Anti-Fog Opp Film (II)", Toyobo, (V-A-212-2), (1985).

*Primary Examiner*—Jenna L. Davis
*Attorney, Agent, or Firm*—Alexander J. McKillop; Dennis P. Santini

[57] ABSTRACT

This invention provides a water-based, insoluble, heat-sealable, anti-fog coating composition to be used for polymer films. The anti-fog composition of the invention includes a non-ionic, hydrophilic surfactant, a hydrophobic binder compatible with the surfactant in an aqueous medium in an amount sufficient to form an emulsion. A heat-sealable polymer film coated with the heat-sealable anti-fog coating composition of the invention is also provided together with a method for preparing the same.

7 Claims, No Drawings

PLASTIC FILMS WITH SURFACE ANTI-FOG PROPERTIES

This application is a continuation-in-part of commonly assigned U.S. application Ser. No. 827,312, filed Jan. 29, 1992, now U.S. Pat. No. 5,246,756.

BACKGROUND OF THE INVENTION

The present invention relates to plastic films and, in particular, to films having improved anti-fog properties.

In the development of films for the packaging of various articles and materials especially foodstuffs, major efforts have been directed to providing films with low permeability to avoid moisture loss from the article or contamination of the article by undesired ambient vapors. Another problem in the use of packaging films, especially for the wrapping of products of high moisture content, is the tendency of moisture within the package to condense as droplets or as a fog on the inside surface of the package especially when the package is refrigerated. The resulting packaged product is unattractive and, the product being displayed is obscured from view by droplets. This characteristic defeats in part the purpose for using a transparent wrapping material.

Attempts have been made in the past to reduce the fogging tendency by applying hydrophilic coatings to the surface of the film in order to overcome the natural hydrophobic characteristics of the film surface and to cause the condensed moisture to wet-out on the film surface, thereby eliminating individual droplet formations and resulting fogging. However, such coatings usually detract from other desirable properties of the film such as gloss and heat sealability. Moreover, such coatings are water soluble materials which wash away when moisture condenses on the coated films.

For example, U.S. Pat. No. 5,030,280 discloses an anti-fog coating of polymethyl methacrylate or polycarbonate which may be applied to packaging films by means of a cloth, spraying or the like. Anionic surfactants described therein have a hydrophilic-lipophilic balance or HLB value of from 2 to less than 13. The coating described therein, like others in prior art, readily washes away.

An anti-fog coating composition with good heat sealability properties which does not wash away easily is highly desirable.

Accordingly, it is an object of the present invention to provide an anti-fog coating which is long lasting and does not wash away easily. It is a further object of the present invention to provide an anti-fog composition which can be readily and effectively applied to oriented substrates at selected times during processing.

It is a further object of the invention to provide an anti-fog composition which when applied to plastic films enhances the heat seal strength of the coated films.

SUMMARY OF THE INVENTION

In accordance with the present invention, plastic films with surface anti-fog coatings are provided which include an oriented polymer film substrate layer having at least one skin and an anti-fog, heat-sealable coating composition. The coating composition is a water-based emulsion of a hydrophilic, non-ionic surfactant and a hydrophobic binder.

More specifically, it has now been found that by mixing a hydrophilic, non-ionic surfactant with a hydrophobic binder, preferably an ethylene acrylic acid copolymer emulsion or melamine formaldehyde resin or mixtures thereof, an unexpectedly long lasting anti-fog composition is obtained which also has enhanced heat sealability properties.

The present invention also provides two preferred methods of applying the anti-fog coating to the polymeric substrate. The first preferred method is an in-line application of the anti-fog coating composition after the polymeric substrate has been stretched in the direction (MD) machine but prior to orientation in the direction (TD) transverse. This method also includes the use of tenter ovens for drying the coating.

The second method is an off-line application of the coating on a substrate where the orientation process of the polymeric substrate is complete. The off-line method of application includes coating in any convenient and known manner, such as dipping, spraying, brushing, roll coating, gravure coating, and the like.

As a result, the films prepared according to this invention demonstrate not only excellent anti-fog properties but also superior heat sealability. Additionally, the coating of the invention may be applied to substrates which have been oriented in solid state. As a result the methods of coating of this invention require less energy, fewer steps and are more cost effective.

Other improvements which the present invention provides over the prior art will be identified as a result of the following description which sets forth the preferred embodiments of the present invention. The description is not in any way intended to limit the scope of the present invention, but rather only to provide a working example of the present preferred embodiments. The scope of the present invention will be pointed out in the appended claims.

DETAILED DESCRIPTION OF THE INVENTION

The anti-fog coating of the present invention is an aqueous emulsion which includes at least one non-ionic, hydrophilic surfactant and one hydrophobic binder which is compatible with the surfactant. For the purpose of the present invention "compatible" means that the hydrophobic binder is capable of forming an emulsion when combined with the hydrophilic non-ionic surfactant in an aqueous environment.

The non-ionic, hydrophilic surfactants which can be used include: polyethylene oxides such as those sold under the name Carbowax, particularly Carbowax-8000 and Carbowax-1540, by Union Carbide Corporation; block copolymers of propylene oxide and ethylene oxide, such as that sold under the name of Pluronic, particularly Pluronic F-68 (HLB=29), by the Chemicals Division of BASF Corporation; alkyl polyethoxy ethanols, such as that sold under the name of Triton, particularly Triton X-67 (HLB=16.7), by the Rohm and Haas Company; polyoxyethylene lauryl ether, such as that sold under the name Brij, particularly Brij-35 (HLB=16.9) and Brij-700 (HLB=16.7), by ICI Americas; polyoxyethylene stearate, such as that sold under the name of Myrj, particularly Myrj-52, by ICI Americas; ethoxylated nonylphenol, such as that sold under the name Igepal, particularly Igepal CO-660 (HLB=13.2) and Igepal CO-520 (HLB=10.0), by GAF; sorbitan monostearate, such as that sold under the name Span, particularly Span-60 (HLB=4.7), by ICI Americas Inc.; sorbitan ester of fatty acid, particularly Atmer-100 (HLB=8.6), by ICI; polyoxyethylene

(20) sorbitan monostearate, particularly Atmer-113 (HLB=14.9) by ICI Americas Inc.; nonionic blend of sorbitan ester of fatty acid, particularly Atmer-645 (HLB=11.0), by ICI; nonionic blend of sorbitan ester of fatty acid, particularly Atmer-685 (HLB=5.8) by ICI; sorbitan laureate, such as that sold under the name Glycomul, particularly Glycomul L (HLB=9.0), Glycomul P (HLB=7.0), Glycomul S (HLB=5.0) and Glycomul O (HLB=4.0) by Lonza; polyglycerol ester of fatty acid, such as that sold under the name Glycolube, particularly Glycolube AFA-1 by Lonza; polyoxyethylene distearate, such as that sold under the name of Pergosperse, particularly Pergosperse 400DS (HLB=7.8), by Lonza; polyoxyethylene (20) sorbitan tristearate, such as that sold under the name of Tween, particularly Tween-65 (HLB=10.5), by ICI Americas; and ethylene glycol monostearate, such as that sold under the name of Tegin, particularly Tegin EGMS/VA, by Goldschmidt Chemical Corp.

The term "HLB" is used herein as defined in the Journal of the Society of Cosmetic Chemists of 1949, pages 311 through 326; and the Journal of the Society of Cosmetic Chemists of 1954, pages 249 through 256. The term "HLB" comes from the word hydrophilic-lipophilic balance. The "HLB" method is described in the Journal of the Society Cosmetic Chemists as a method which assigns numerical values to surfactants thereby providing a system of classification that is related to their behavior and solubility in water. The "HLB" method is based on the premise that all surfactants combine hydrophilic and lipophilic groups in one molecule and that the proportion between the weight percentages of these two groups for nonionic surfactants as an indication of the behavior that may be expected from the product.

Generally, the hydrophilic, non-ionic surfactants of the present invention have an HLB value greater than 4 and less than 30. In a preferred embodiment of this invention, the surfactants have an HLB value greater than or equal to 13 and less than or equal to 20. Such an HLB value would ensure that the surfactants are water soluble.

The hydrophobic binders of the present invention include ethylene-acrylic acid emulsions, such as those which are commercially sold under the name Michem, particularly Michem-4983, by Michelman Corporation; acrylic emulsions, such as those sold under the name of Acrylic, particularly Acrylic 79XW318A and 89XW055, by Valspar Corporation; surlyn emulsions, such as that sold under the name of Adcote, particularly Adcote 56220, by Morton International, the specialty chemicals group; and melamine formaldehyde resins, such as that sold under the name of Parez, particularly Parez-613, by American Cyanamid Company.

The hydrophilic, non-ionic surfactants and hydrophobic binders are mixed in aqueous media to form an emulsion. It has been found that by mixing an amount of non-ionic, hydrophilic surfactant with an amount of hydrophobic binder in the presence of water in amounts sufficient to form an emulsion an unusually long lasting anti-fog coating which also has good heat seal properties is formed. More specifically, the dry material concentration of surfactant can range from about 5% to about 90% and preferably 10-50 per cent by weight. The amount of binder can range from about 10 to about 95 and preferably 50-90 per cent by weight. The final solid content of the coating solution can range from 1 to 20% in water depending on the coating methods known in the art.

Other materials may be added to the coating of the invention. Some materials are used to enhance the ability of the coating to remain an emulsion until it dries. Other materials can be added in order to realize special advantages in addition to superior anti-fog properties. For example, it has been found that to maintain the coating composition as an aqueous homogenous emulsion, a high pH environment is preferred for Michem-4983, which can be maintained by adding sodium, potassium or ammonium hydroxide. Parez-613 is water soluble. Upon addition of ammonium chloride Parez-613 becomes crosslinked and hydrophobic when the coating is dried. Other constituents which may be added to the anti-fog coating of the invention include additive materials, such as fillers, stabilizers, plasticizers, colorants, slip agents, anti-blocking agents, anti-static, anti-oxidant and the like, provided, however, they are present in minimal amounts which will not offset the anti-fog properties of the composition of the invention.

In a preferred embodiment of the present invention, a film of oriented polypropylene (OPP) is initially treated using corona treatment or alternative methods known in the art for oxidizing film surfaces to create a high energy surface environment sufficient for the adhesion of a water-based anti-fog emulsion coating. Corona treatment is a particularly desirable method of treatment of the surface of the plastic film. It is accomplished by exposing the film's surface to a high voltage corona discharge while passing the film between spaced electrodes. After electronic treatment of the film's surface, the coating composition is applied thereto.

After the film's surface has been sufficiently oxidized, the anti-fog composition of the present invention is applied to the film's surface. The coating is preferably applied to the substrate as an aqueous emulsion in-line after the MD but before the TD orientation of the plastic film. More specifically, a single or coextruded layer of a thermoplastic film, such as polypropylene, is extruded and solidified, and thereafter oriented in the MD. The anti-fog coating composition can thereafter be roll-coated on the already MD oriented substrate polypropylene film. The coated field is subsequently oriented in the TD utilizing, for example, a tentering device. The orientation of the polymer film is conducted at relatively low temperatures of from about 100° C. to about 160° C. employing commercially available sequential biaxial orientation apparatus.

The anti-fog composition may also be applied to the plastic film by an off-line process. Off-line application of the anti-fog composition includes any conventional methods. For example, the anti-fog coating may be effected by roller coating, spray coating, slot coating, or immersion coating. Preferably, the coating is applied by the gravure roll coating process. Also, the uniaxially drawn film may be subjected to a corona discharge apparatus prior to coating as is known in the art. When applied off-line, sometimes an adhesion promoting primer is applied onto the film surface before the antifog coating is applied. Typical primers are polymers with good adhesion to OPP properties such as polyethyleneimine or epoxy resins.

It is also possible to apply the coating composition to one surface of the polymer film as a solution where the solvent is an organic compound such as alcohol, ketone or an ester. It is preferable, however, that the coating composition be applied from an aqueous media. When the coating is applied from an aqueous media it is deposited in any convenient known manner such as by gravure coating, roll coating, dipping or spraying. The excess aqueous solution can be removed in the tenter ovens or by squeeze rolls or doctor knives.

Whether applied by an in-line or off-line process, the coating should be applied in an amount such that upon drying a smooth, evenly distributed layer is obtained. A preferred coating weight for the coating layer is from about 0.05 to about 1.5 grams per 1000 in$^2$ of surface area.

The substrate can be of any desired thickness, although thicknesses will typically range from about 0.5 to about 2 mils to ensure good machinability on high-speed packaging equipment. Although the examples included herein provide for the application of the coating of the present invention to OPP films, nylon or polyethylene film would also be suitable candidates for receiving the coating. Moreover, when the anti-fog coating of the invention was applied onto heat sealable polypropylene films the heat sealable properties of the films were also enhanced.

A wide variety of substrate materials may be used with the anti-fog composition of this invention. Useful substrates include oriented polypropylenes (OPP), polyethylene, nylon, polyethylene terephthalate, polystyrene, polyvinyl chloride.

EXAMPLES

The following examples serve to provide further appreciation of the invention but are not meant in any way to restrict the effective scope of the invention.

EXAMPLE 1

A base film was provided which included a core prepared from polypropylene homopolymer (OPP) sold as Exxon 4252. Each surface of the core had a skin material made from ethylene propylene copolymer to obtain a three-layer structure. The homopolymer is used to obtain a stiff core layer which when covered with a copolymer skin results in a film having an enhanced heat seal capability.

The OPP based film was corona treated for a sufficient period of time to provide an effective oxidation of the OPP film. The OPP polymer film was then coated off-line by using a laboratory coater with the surfactant-binder compositions listed in Table 1.

scotch tape. The pouches were stored in a cold room (35°–40° F.) for 10 days. The fogging appearance inside the pouches was noted.

All three anti-fog coating compositions showed excellent anti-fog properties as compared to untreated OPP film as more specifically shown in Table 1. Thus, after ten (10) days of use as a fresh salad wrap there was no fog observed inside each of the films coated with the anti-fog composition of the invention while an uncoated film shown in Sample 4 took only 24 hours to be completely fogged.

In addition, the samples of Table 1 were also evaluated for heat sealability by the crimp heat seal test. The crimp seal test is a heat seal test designed to simulate conditions under which films might be sealed in a typical over-wrapping machine. For the test, two strips of film are superimposed with coated surfaces, i.e., the antifog coating surface in contact, and placed in a heat sealing machine with a pair of crimp jaws. On actuation, the heated platen lowers and contacts the film combination for a controlled period of time. The pressure used is that resulting from the force of a pressure cylinder set at about 20 psi and the time of contact is 0.75 seconds. The film strips are cut one inch wide and the seal strengths are determined by placing the free ends of the film in the jaws of a Suter testing machine and pealing the seals apart at a rate of 20 inches per minute. The maximum force in grams is recorded as the heat seal strength.

As can be seen from Table 1, good heat seal strengths greater than or equal to 300 g/in are achieved at 250° F., which is considered a low, quite desirable heat seal temperature. Thus, samples 1–3 of Table 1 showed very good heat seal strength values, all greater than 300 g/in. Samples 1 and 3 which had heat seal strengths of 360 and 380 g/in, respectively, exceeded the preferred heat seal strength value of 300 g/in. In one case, sample 2 showed an excellent heat seal strength at 580 g/in while maintaining excellent anti-fog properties.

EXAMPLE 2

A base film was provided as in Example 1. The OPP polymer film was then coated off-line with heat sealable, surfactant-binder compositions listed in Table 2 by using a laboratory coater.

The heat sealable, anti-fog coating compositions of Table 2 were prepared by mixing polyoxyethylene (20)

TABLE 1

| Sample # | Anti-Fog Coating | | Coating weight g/msi | Anti-Fog Appearance 10 days, 35–40° F. | Crimp Seal Strength 250° F. (g/in) |
|---|---|---|---|---|---|
| 1 | Pluronic F-68 | (100 phr)[1] | 0.15 | no fog inside the film surface | 360 |
|   | Parez-613 | (10 phr) | | | |
|   | NH$_4$Cl | (0.5 phr) | | | |
| 2 | Triton X-67 | (50 phr) | 0.14 | no fog inside the film surface | 580 |
|   | Michem-4983 | (50 phr) | | | |
| 3 | Carbowax-8000 | (100 phr) | 0.11 | 10% fog | 380 |
|   | Parez-613 | (10 phr) | | | |
|   | NH$_4$Cl | (0.5 phr) | | | |
| 4 | plain OPP with no coating | | — | 100% fog in 24 hours | 800 |

[1]Part per hundred of reactant

The anti-fog coating compositions included Pluronic F-68/Parez-613/NH$_4$Cl (Sample 1), and Triton X-67/Michem-4983 (Sample 2) and Carbowax-8000/Parez-613/NH$_4$Cl (Sample 3) solutions.

The coated films were made into pouches with the coating inside, filled with 8 oz. of fresh salad from a fast food restaurant, and sealed by taping the sides with sorbitan monostearate, a non-ionic surfactant known as Atmer-113 with Michem-4983, a hydrophobic, binder and melamine formaldehyde known as Cymel 350, another binder, in the amounts shown in Table 2.

The anti-fog properties of each sample film were evaluated by using the long term aging test. In the long term aging test a coated polymer film was used to cover a beaker half-filled with water. The covered beaker was placed in a refrigerator for fourteen (14) days and the amount of water condensation on the polymer film was observed. Poor anti-fog properties were rated 0, and good anti-fog properties were rated 4 and excellent anti-fog properties were rated 5.

TABLE 2

Anti-fog Coatings (coated on OPP films with copolymer skins)

| Sample # | Atmer-113 (phr) | Michem-4983 (phr) | Cymel-350 (phr) | $NH_4Cl$ (phr) | Coating Weight g/msi | Antifog Rating | Seal Strength at 250° F. g/in |
|---|---|---|---|---|---|---|---|
| 1 | 20 | 100 | 0 | 0 | 0.02 | 3 | 980 |
| 2 | 60 | 100 | 0 | 0 | 0.06 | 4 | 490 |
| 3 | 100 | 100 | 0 | 0 | 0.10 | 5 | 380 |
| 4 | 20 | 100 | 15 | 1 | 0.10 | 4.5 | 800 |
| 5 | 60 | 100 | 15 | 1 | 0.06 | 4 | 570 |
| 6 | 100 | 100 | 15 | 1 | 0.02 | 3.5 | 660 |

Samples 2 to 5 listed in Table 2 represent anti-fog coating compositions of the invention. It is readily apparent that as long as the coating composition contained a mixture of a hydrophilic surfactant and hydrophobic binder as shown in Sample 3, the anti-fog coatings of the invention exhibited both excellent anti-fog rating and good heat seal strength. When a second binder was added such as melamine formaldehyde of low methylol content as found in Cymel 350, then unexpectedly high heat seal strengths were obtained while also maintaining good anti-fog properties as shown in Sample 4 of Table 2. Unlike the inventive compositions of samples 2 to 5, in the other samples shown in Table 2, the coating weight of the anti-fog coatings was too light. Thus, to maintain good or excellent anti-fog properties the weight of the coating composition shall be maintained at about 0.05 g/msi or higher.

COMPARATIVE EXAMPLES

The following control experiments were conducted under the same conditions as the examples above to show the clear advantages of the present invention.

EXAMPLE 3

A base film was provided as in Example 1. Anti-fog compositions as listed in Table 3 were applied following a conventional in-line method of application. Unlike the inventive compositions, Sample 2 of Table 3 was coated only with a hydrophobic binder and no surfactant. Samples 3–7 shown in Table 3 were coated with compositions which only had a hydrophilic non-ionic surfactant and no hydrophobic binder.

The shellac coating used for the screening tests of Example 3 had a pH of 12.6 and the following composition:

| | |
|---|---|
| Shellac flakes (super blond) | 2.0% |
| Methanol | 0.67% |
| NaOH | 0.3% |
| Carbowax 1540 | 0.67% |
| Water | 96.36% |

The Hamposyl coatings were prepared as 2% water solutions.

TABLE 3

| | Coatings | | | |
|---|---|---|---|---|
| Sample # | Coating | Coating[1] Weight | COF[2] | Rating[3] |
| | — | — | 0.63 | 1 |
| 2 | Shellac[4] | 0.01 | >1.0 | 1 |
| 3 | CF-190 (XA5836)[5] | 0.01 | 0.46 | 1 |
| 4 | Hamposyl O[6] | 0.02 | 0.25 | 2 |
| 5 | Hamposyl AL-30[7] | 0.01 | 0.48 | 1 |
| 6 | Hamposyl C-30[8] | 0.01 | 0.32 | 1 |
| 7 | Hamposyl C[9] | 0.03 | 0.31 | 1 |

[1] Coating weight is in g/msi or grams per thousand square inch
[2] Coefficient of friction
[3] Anti-fog rating (steam test):
1 = no anti-fog property
5 = excellent anti-fog property
[4] Super Blond shellac from J. E. Rogers, Macedon, NY
[5] Ammonium lauroyl sarcosinate from W. R. Grace
[6] Oleoyl sarcosine from W. R. Grace
[7] Lauroyl sarcosine from W. R. Grace
[8] Sodium cocoyl sarcosinate solution from W. R. Grace
[9] Cocoyl sarcosine from W. R. Grace Each sample film was evaluated for its anti-fog properties by using the steam test. In the steam test sample films were held three inches above a beaker of boiling water for one minute. The fogging appearance of each film was rated from 1 to 5, where 1 showed no anti-fog property and 5 showed excellent anti-fog property.

None of the samples showed desirable anti-fog properties. It became apparent that when the films were coated with only a hydrophobic binder or a hydrophilic, non-ionic surfactant the resulting coating compositions had poor anti-fog properties.

EXAMPLE 4

Heat sealable polypropylene samples were in-line coated with a gravure coater with anti-fog coating compositions listed in Table 4. Again, unlike the inventive compositions, the samples shown in Table 4 were coated with compositions which contained only a non-ionic, hydrophilic surfactant but no hydrophobic binder.

TABLE 4

In-Line BSR Films Coated with Anti-fog Compositions

| Sample # | Anti-Fog Composition | % Solid | Anti-Fog Rating[1] | Contact Angle[2] | HeatSeal Property |
|---|---|---|---|---|---|
| 1 | Atmer-100[3] (with IPA)[4] | 8.00 | 1 | | |
| 2 | Atmer-100[3] + 0.05% SLS[5] | 8.05 | 1 | | |
| 3 | Atmer-100[3] + 0.15% SLS | 8.15 | 1 | | |

TABLE 4-continued

In-Line BSR Films Coated with Anti-fog Compositions

| Sample # | Anti-Fog Composition | % Solid | Anti-Fog Rating[1] | Contact Angle[2] | HeatSeal Property |
|---|---|---|---|---|---|
| 4 | Atmer-100[3] + 0.25% SLS | 8.25 | 1 | | |
| 5 | Atmer-100[3] (without IPA) | 8.00 | 1 | | |
| 6 | Atmer-100[3] + 0.10 SLS | 8.10 | 1 | | |
| 7 | Glycolube AFA-1[6] | 8.00 | 5 | | poor |
| 8 | Glycolube AFA-1 | 1.00 | 1 | 84 | good |
| 9 | Glycolube AFA-1 | 2.00 | 1 | 81 | good |
| 10 | Glycolube AFA-1 | 4.00 | 5 | 8 | poor |
| 11 | Glycolube AFA-1 | 6.00 | 5 | 3 | poor |
| 12 | Glycolube AFA-1 | 8.00 | 5 | 5 | poor |
| 13 | Glycolube (w/IPA) | 1.00 | 1 | 77 | |
| 14 | Glycolube (w/IPA) | 2.00 | 1 | 57 | |
| 15 | Glycolube (w/IPA) | 4.00 | 5 | 7 | poor |
| 16 | Glycolube (w/IPA) | 6.00 | 5 | 3 | poor |
| 17 | Glycolube (w/IPA) | 8.00 | 5 | 3 | poor |
| 18 | Igepal CO-520 (w/IPA)[7] | 4.00 | 1 | 76 | |
| 19 | Igepal CO-520 (w/IPA)[7] | 8.00 | 1 | 75 | |
| 20 | Igepal CO-660 (w/IPA)[8] | 4.00 | 1 | 70 | |
| 21 | Igepal CO-660 (w/IPA)[8] | 8.00 | 2 | 3 | |
| control | no coating | | 0 | 95 | |

[1]Anti-Fog ratings after 14 days in refrigerator
0 = no anti-fog property
5 = excellent anti-fog property
[2]Contact angle was measured with a water droplet on the film surface
[3]Sorbitol ester of fatty acid
[4]IPA: isopropyl alcohol
[5]SLS: sodium lauryl sulfate
[6]Polyglycerol ester of fatty acid
[7]Ethoxylated nonylphenol
[8]Ethoxylated nonylphenol Each sample film was evaluated for its anti-fog properties by using the long term aging test. In the long term aging test a polymer film was used to cover a beaker half-filled with water. The covered beaker was placed in a refrigerator for fourteen days and the amount of water condensation on the polymer film was observed. Poor anti-fog properties were rated 0, and good anti-fog properties were rated 5.

In addition, the samples of Table 4 were also evaluated for heat sealability by the crimp heat seal test described in Example 1.

As can be seen from Table 4, while good anti-fog properties were provided as the concentration of the anti-fog surfactant was increased, the heat seal properties decreased. As a result, it became apparent that when the films were coated only with a non-ionic, hydrophilic surfactant, the films had poor heat sealability properties, and thus are not suitable for food wrapping.

EXAMPLE 5

Anti-fog coating compositions containing non-ionic, hydrophilic surfactants but no hydrophobic binders as listed in Table 5 were applied off-line on heat sealable polypropylene films by using a laboratory pilot coater. The comparative results are shown in Table 5.

TABLE 5

Off-Line Anti-fog Coatings

| Sample # | Anti-fog[1] Agent | % Solid | Heat Seal Strength[2] 260° F. | 270° F. | 280° F. | Heat Anti-Fog Rating[3] 1 day | 7 days | 14 days | Contact[4] Angle |
|---|---|---|---|---|---|---|---|---|---|
| control | none | | | | | 0 | 0 | 0 | 88 |
| 1 | Atmer-100 | 1.0 | 30 | 75 | 320 | 5 | 5 | 5 | 48 |
| 2 | " | 0.6 | 30 | 135 | 315 | 4 | 2 | 2 | 49 |
| 3 | " | 0.2 | 35 | 250 | 455T | 1 | 0 | 0 | 65 |
| 4 | Atmer-645 | 1.0 | 20 | 55 | 215 | 4 | 0 | 0 | 14 |
| 5 | " | 0.6 | 40 | 125 | 335T | 3 | 0 | 0 | 68 |
| 6 | " | 0.2 | 50 | 235 | 500T | 1 | 0 | 0 | 75 |
| 7 | Atmer-685 | 1.0 | 90 | 245 | 400T | 2 | 0 | 0 | 80 |
| 8 | " | 0.6 | 120 | 240 | 530T | 0 | 0 | 0 | 83 |
| 9 | " | 0.2 | 140 | 260 | 495T | 0 | 0 | 0 | 84 |

[1]Atmer-100-sorbitan ester
[2]ESM seal strength, 5 psi, 2 sec. dwell, T = tear (g/in)
[3]Anti-fog rating after 1 day, 7 days, 14 days refrigeration, 0 = worst, 5 = best
[4]Water droplet on film surface was measured by using a goniometer.

A comparison of the heat seal strengths for the films listed in Table 5 shows that when hydrophobic binders are excluded from the anti-fog coating acceptable heat seal strengths greater than or equal to 300 g/in are achieved only at high temperatures of 280° F. and above. The higher the heat seal temperature requirement the lower the speed with which the packaging machine was required to turn in order to achieve an acceptable heat seal strength value. When the heat seal temperature requirements are very high the overall process becomes cost ineffective. For example, films coated with Atmer-100 showed good anti-fog properties but very poor heat seal properties, again making these films undesirable for wrapping food.

EXAMPLE 6

The samples investigated in this example were coated with very low coating weights of anti-fog compositions including representative components of the inventive compositions. For example, the coating compositions tested in the set of comparative results included Hamposyl, a hydrophilic surfactant, Acrysol ASE60, an acrylic binder manufactured by Morton-Thiokol and a wax emulsion of Michem M-156, a wax manufactured by Michelman, Inc. Mixtures of Hamposyl/Acrysol/Michem M-156 in a ratio of 4.5/1.5/1.0 by weight were in-line coated on OPP films. The comparative results are shown in Table 6.

TABLE 6

| Sample # | Coating | % Solid | Coat Weight[1] | Anti-fog Rating[2] |
|---|---|---|---|---|
| 1 | Hamposyl L-30[3] Acrysol ASE60[4] Michem M-156[5] | 7.8 | 0.035 | 3 |
| 2 | Hamposyl L-30[3] Acrysol ASE60[4] Michem M-156[5] | 5.9 | 0.02 | 1 |
| 3 | Hamposyl L-30[3] Acrysol ASE60[4] Michem M-156[5] | 3.9 | 0.01 | 1 |
| 4 | Hamposyl L-30[3] Acrysol ASE60[4] Michem M-156[5] | 3.9 | 0.03 | 3 |
| 5 | Hamposyl AL-30[6] Acrysol ASE60 Michem M-156 | 7.8 | 0.01 | 1 |
| 6 | Acrysol ASE60 only | 10.0 | 0.08 | 1 |

[1]Coat weight in g/msi
[2]Anti-fog rating (steam test):
1 = no anti-fog property
5 = excellent anti-fog property
[3]Lauroyl sarcosine from W. R. Grace
[4]Acrylic emulsion from Morton-Thiokol
[5]carnauba wax emulsion
[6]Ammonium lauroyl sarcosine from W. R. Grace None of the films coated with very low coating weight compositions showed acceptable anti-fog properties. For that reason, the heat seal properties were not even investigated. It became readily apparent that in order to achieve superior anti-fog and heat seal properties the coating weights of the inventive compositions must at least 0.05 grams per 1,000 square inches (gram per msi) or more.

Thus, while there have been described what are presently believed to be the preferred embodiments of the present invention, those skilled in the art will realize that other and further modifications can be made without departing from the true spirit of the invention and is intended to include all such modifications and variations as come within the scope of the claims as set forth below.

We claim:

1. A polymer film which is heat sealable and which has anti-fog properties which comprises:
   (a) a substrate having at least one high energy surface; and
   (b) an anti-fog coating composition applied to said high energy surface as a substantially continuous, adherent anti-fog coating, said coating composition comprising:
   (i) at least one non-ionic, hydrophilic surfactant;
   (ii) at least one hydrophobic, water dispersable binder compatible with said surfactant; and
   (iii) an aqueous medium in an amount sufficient to form an emulsion of said surfactant and binder;
   (c) said coating composition applied to said substrate in an amount from about 0.05 gram to about 1.5 gram per 1000 square inches, whereby said polymer film has a heat seal strength equal to or exceeding 300 g/inch at about 250° F.
   wherein said binder is selected from the group consisting of ethylene acrylic acid copolymer emulsion, acrylic emulsions, ionomeric resin emulsions and melamine-formaldehyde resin and mixtures thereof.

2. The polymer film of claim 1, wherein said coating has a coating weight of at least about 0.05 g/msi.

3. The polymer film of claim 1, wherein said non-ionic, hydrophilic surfactant is selected from the group consisting of polyoxyethylene, polyoxypropylene, polyoxyethylene ether, polyoxypropylene ether, poly(ethylene oxide/propylene oxide) block copolymers, alkyl polyethoxy ethanols, polyglycerol esters of fatty acids, sorbitan ester of fatty acid, sorbitan ester blend, polyoxyethylene lauryl ether, polyoxyethylene stearate, ethylene glycol monostearate, sorbitan laureate, sorbitan oleate, sorbitan palmitate, sorbitan stearate and mixtures thereof.

4. The polymer film of claim 1, wherein said non-ionic, hydrophilic surfactant is selected from the group consisting of polyglycol ester of fatty acid, polyethylene oxide, poly (ethylene oxide/propylene oxide) block copolymer, alkyl polyethoxyethanol and mixtures thereof.

5. The polymer film of claim 1, wherein said substrate is selected from a group consisting of oriented polypropylenes, polypropylene homopolymer, broad seal range polypropylene and mixtures thereof, polyethylene, polystyrene, nylon, polyethylene terephthalate.

6. The polymer film of claim 1, wherein said anti-fog coating composition is water-based.

7. The polymer film of claim 1, wherein said substrate is oriented polypropylene.

* * * * *